(No Model.)

T. FROGGATT.
SUPPORT FOR ELECTRICAL BATTERIES USED ON VEHICLES.

No. 544,430. Patented Aug. 13, 1895.

Witnesses
H. van Oldenneel
E. K. Sturtevant

Inventor
Thomas Froggatt
by
Attorneys

UNITED STATES PATENT OFFICE.

THOMAS FROGGATT, OF LONDON, ENGLAND.

SUPPORT FOR ELECTRICAL BATTERIES USED ON VEHICLES.

SPECIFICATION forming part of Letters Patent No. 544,430, dated August 13, 1895.

Application filed May 1, 1895. Serial No. 547,756. (No model.)

*To all whom it may concern:*

Be it known that I, THOMAS FROGGATT, residing at London, England, have invented Improvements in and Connected with Supports for Electrical Batteries Used on Vehicles and the Like, of which the following is a specification.

This invention relates to supports for electrical batteries used upon vehicles or where vibration is experienced to a considerable extent, and has for its object the construction of the battery-supports in such a form as to prevent as far as possible the communication of vibration from the vehicle or other vibrating support to the battery. It has been found that this vibration has a very destructive effect upon the internal arrangements of the batteries, necessitating a very heavy expenditure for repairs and renewals, and, further, as it is usual to connect the battery with the circuit by means of spring connection of such a form that the circuit is continually broken by the relative movement of the battery-cells with the vehicle or other support the light or supply of energy suffers considerably from want of uniformity of transmission of current through the circuit, and much annoyance is caused thereby.

This invention has further for its object the obviation of all these disadvantages; and it consists in the mounting of the battery upon elastic or flexible supports carried by the vehicle or other device upon which the batteries are situated, so arranged that when the battery is put in place the electrical connections are automatically made at the same time.

In order that my invention may be the better understood, I will now proceed to describe it in relation to the accompanying drawings, reference being had to the letters marked thereon.

Like letters refer to like parts in the various views.

Figure 1:
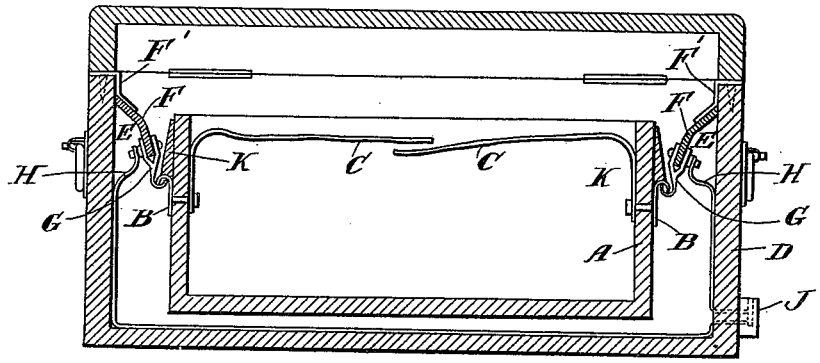
Figure 2:
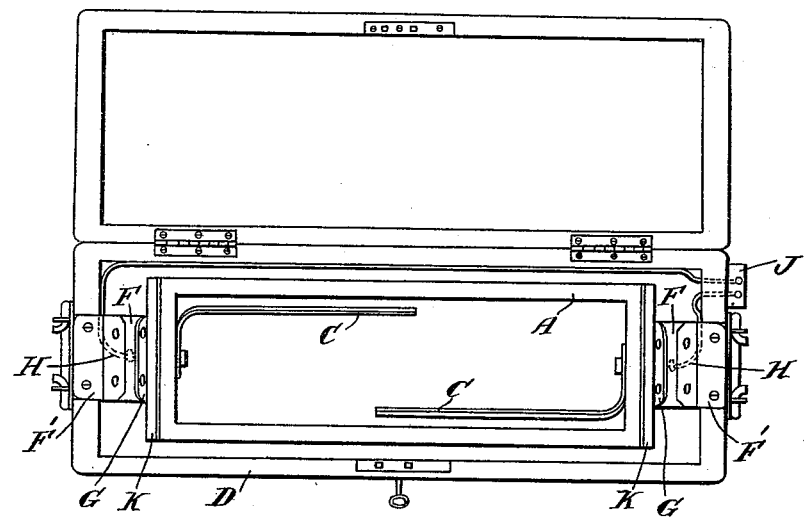
Figure 3:
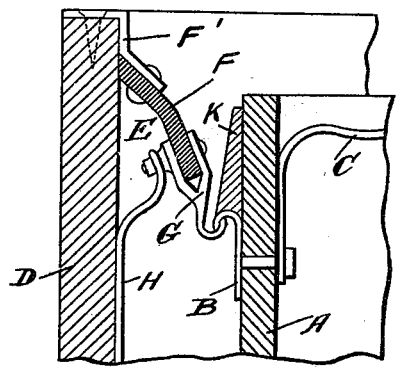

Figure 1 is a sectional elevation of a battery supported within a box or case according to my invention. Fig. 2 is a plan of the same, the box being in the open position. Fig. 3 is an enlarged sectional view of the electrical connecting and supporting device.

To carry my invention into effect, at each end of the battery box or case A for containing the cells I arrange metal supports B, firmly affixed thereto, which are made in the form of an inverted gutter or with such an edge as will prevent any large amount of lateral displacement relatively to the main support upon which they rest. These supports B are electrically connected respectively with the terminal bars C, to which the cells are connected upon any convenient part of the vehicle or other device carrying the battery; or, as shown in the drawings, upon the interior sides of an outer case D, I arrange elastic and insulated supporting-pieces E, upon which the supporting-pieces B are engaged.

The elastic insulated supports E are formed of a piece of insulating flexible material F, such as india-rubber or the like, which is firmly attached at one end to a suitable metal clip F', which is fixedly attached to the box or case D, the other end of the flexible material F being attached to a metal piece G, with an upturned edge adapted to engage with the hook portion of the supporting-piece B, so as to make electrical connection therewith. The strips of flexible material F are arranged in such a way as to have a considerable amount of elasticity and to permit the battery to be elastically supported with a reasonable range of movement to take off vibration. The insulated metal pieces G are connected by the wires H to a connector J, to which the external leads for the transmission of electrical energy are attached. I further support the pieces B by arranging a wooden fillet K to take the weight and prevent the bending out of the hooked portion.

When it is necessary, as in secondary batteries, to recharge the same immediately, the battery is lifted from the supports E, the circuit is broken, and upon replacing it the circuit is automatically made.

The vibration from the vehicle is not communicated to the battery to any serious extent, but is absorbed by the elastic supports. The movement of the supports B and E one on the other insures good contact being kept up between them.

It is quite obvious that the arrangement of the parts may be equivalently effected by the converse disposition of the supporting device—viz., that in which the elastic support is put on the detachable battery box or case A.

Having now particularly described the nature of my invention, what I desire to claim and to secure by Letters Patent is—

In a support for electrical batteries a connecting piece elastically mounted upon and insulated from the part upon which it is mounted in combination with another connecting piece adapted to make electrical connection with the elastically mounted connecting piece so as to absorb vibration and prevent its transmission from one to the other substantially as described.

In testimony whereof I have signed my name to this specification in the presence of two subscribing witnesses.

THOMAS FROGGATT.

Witnesses:
RICHARD A. HOFFMANN,
CHARLES H. CARTER.